Patented Nov. 24, 1953

2,660,606

UNITED STATES PATENT OFFICE 2,660,606

ANTIOXIDANTS

Thomas H. Newby, Middlebury, Conn., assignor to United States Rubber Company, New York, N. Y., a corporation of New Jersey No Drawing. Application October 12, 1951,
Serial No. 251,130

9 Claims. (Cl. 260—576)

This invention relates to improvements in the manufacture of aliphatic ketone-diarylamine antioxidants, and more particularly to the composite product resulting from a conversion of the relatively hard resinous aliphatic ketone-diarylamine antioxidants, more especially such as shown in Tuley et al. U. S. Patent No. 2,202,934, and Dewey U. S. Patent No. 2,233,590.

According to the present invention, a preformed solid resinous aliphatic ketone-diarylamine reaction product, especially one produced in the range of about 140 to about 160° C., is heated with at least one cyclo-olefin selected from the class consisting of cyclohexene, butadiene dimer, and dipentene. These chemicals are considered to have, respectively, the formulas:

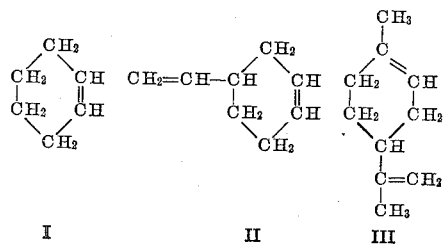

I  II  III

By the reaction with the said cyclo-olefin, the solid ketone-amine product is converted to a mobile oily material having a viscosity of from about 10 to about 50 poises, measured at 30° C. The time and temperature may be varied, the higher the temperature, the shorter the correlative time. Generally, the temperature may be in the range from about 200° C. to about 300° C. and correlatively from about 5 to about 15 hours.

Any of the various known catalysts which are known to catalyze the condensation of aliphatic ketones with diarylamines may be used to catalyze the present conversion of the preformed ketone-amine products. Among them, but not exclusively, are especially iodine, hydriodic acid, bromine, hydrobromic acid, and the water-soluble iodides and bromides of amphoteric polyvalent metals. Included among the latter are ferrous iodide, zinc iodide, ferrous bromides, zinc bromide.

The preformed solid aliphatic ketone-diarylamine reactant may be free of catalyst which was used in its preparation (usually removed by washing with caustic soda solution), or it may be an unwashed solid condensate containing some of the original catalyst. In such a case it is optional whether additional catalyst is added for the present conversion operation.

The proportion of ketone and diarylamine may be varied within wide limits. An excess of either may be used, or they may be present in substantially equimilar proportions. It is preferred, however, to use the ketone in excess. Unreacted excess of starting reactants are desirably recovered.

The conversion reaction is conveniently carried out in a metal or glass lined vessel under atmospheric or superatmospheric pressures. In practice, the ketone-amine reaction product is mixed with 5 to 100 percent of its weight of the cyclic olefin and 0.1 to 2.0 percent of catalyst. The autoclave is sealed and heated for five to fifteen hours at 200–300° C. after which the volatile products are vented off and the autoclave discharged. The final product is a smooth flowing viscous oil which is useful as a rubber antioxidant.

It is optional whether the resulting viscous oil is washed substantially free of halogen-containing catalyst. If desired, this may be done with dilute alkali and water.

The following examples illustrate the invention, parts being by weight:

EXAMPLE 1

A mixture of 100 parts of the acetone-diphenyl-amine condensate prepared according to Example 1 of U. S. Patent No. 2,202,934, 35 parts dipentene, and 1 part iodine are heated in a sealed tube 8 hours at 250° C. At the end of this time the reaction mixture is cooled, washed with dilute sodium bicarbonate solution, and finally with water. It is dried and topped to 60° C. at 1 mm. pressure to remove dipentene and other low boiling products, giving a dark, mobile oily material, which is directly useful as a rubber antioxidant.

EXAMPLE 2

Example 1 is repeated using butadiene dimer in place of dipentene. A dark mobile oily material is obtained which is useful as a rubber antioxidant.

EXAMPLE 3

Example 1 is repeated using cyclohexene in place of dipentene. A dark, mobile liquid is obtained which is useful as a rubber antioxidant.

*Rubber testing data*

The following data show the superiority of these chemicals when tested in a high grade tire tread recipe; parts being by weight.

| | |
|---|---|
| Smoked sheet | 100.0 |
| Carbon black | 45.0 |
| Zinc oxide | 5.0 |
| Pine tar | 3.5 |
| Lauric acid | 3.5 |
| Sulfur | 3.0 |
| Mercaptobenzothiazole | 1.0 |
| Antioxidant | 1.0 |

Cure: Sixty minutes at 30 lbs. per square inch steam pressure. Samples were cut and tested for their flexing ability based on an index of 100 for the control.

| | |
|---|---|
| Control | 100 |
| Acetone-diphenylamine condensate of U. S. Patent No. 2,202,934 | 160 |
| Dipentene derivative | 225 |
| Butadiene dimer derivative | 228 |
| Cyclohexene derivative | 222 |

The product of reaction is characterized by a viscosity in the range of 10 to 50 poises, and a volatility generally in the range of 75–85%, to a distillation temperature of 150° C. at 1 mm. pressure. This is in contrast to the intermediate ketone-amine product which is substantially non-volatile or not more than about 13% under the same conditions.

Other amines suitable for reaction with the ketone for the purposes of the present invention include N,N-diphenyl p-phenylene diamine, ditolylamine, dixylylamine, phenyl tolylamine, dinaphthylamine, phenyl alpha naphthylamine, phenyl betanaphthylamine. The ketones that may be reacted with the diphenylamine and any of the above amines, include methyl ethyl ketone, diethyl ketone, mesityl oxide, phorone, dimethyl ketone, dipropyl ketone, dibutyl ketone.

The chemicals prepared by this invention, as indicated above, are useful in imparting increased flex-cracking resistance to natural rubbers as well as to the various similar vulcanizable (sulfur-reactive) synthetic rubbers, which includes such rubbery materials as the butadiene-styrene copolymer, the butadiene-acrylonitrile copolymer, the copolymer of isobutylene with a small amount of isoprene, etc.

Having thus described my invention, what I claim and desire to protect by Letters Patent is:

1. A method which comprises heating a solid composite aliphatic ketone-diarylamine condensate with a cyclo olefin selected from the class consisting of cyclohexene, butadiene dimer, and dipentene, for a time and at a temperature in the range from about 200 to about 300° C. sufficient to convert the original solid composite condensate to a mobile oily liquid, characterized as having a viscosity in the range of 10 to 50 poises at 30° C., said heating being carried out in the presence of a catalyst capable of condensing aliphatic ketones with diarylamines.

2. A method which comprises heating a solid composite acetone-diphenylamine condensate with a cyclo-olefin selected from the class consisting of cyclohexene, butadiene dimer, and dipentene, for a time and at a temperature in the range from about 200 to about 300° C. sufficient to convert the original solid composite condensate to a mobile oily liquid, characterized as having a viscosity in the range of 10 to 50 poises at 30° C., said heating being carried out in the presence of a catalyst capable of condensing aliphatic ketones with diarylamines.

3. A method which comprises heating a solid composite aliphatic ketone-diarylamine condensate with cyclohexene, for a time and at a temperature in the range from about 200 to about 300° C. sufficient to convert the original solid composite condensate to a mobile oily liquid characterized as having a viscosity in the range of 10 to 50 poises at 30° C., said heating being carried out in the presence of a catalyst capable of condensing aliphatic ketones with diarylamines.

4. A method which comprises heating a solid composite aliphatic ketone-diarylamine condensate with butadiene dimer, for a time and at a temperature in the range from about 200 to about 300° C. sufficient to convert the original solid composite condensate to a mobile oily liquid characterized as having a viscosity in the range of 10 to 50 poises at 30° C., said heating being carried out in the presence of a catalyst capable of condensing aliphatic ketones with diarylamines.

5. A method which comprises heating a solid composite aliphatic ketone-diarylamine condensate with dipentene, for a time and at a temperature in the range from about 200 to about 300° C. sufficient to convert the original solid composite condensate to a mobile oily liquid characterized as having a viscosity in the range of 10 to 50 poises at 30° C., said heating being carried out in the presence of a catalyst capable of condensing aliphatic ketones with diarylamines.

6. A modified aliphatic ketone-diarylamine reaction product resulting from a process as set forth in claim 1.

7. A modified aliphatic ketone-diarylamine reaction product resulting from a process as set forth in claim 3.

8. A modified aliphatic ketone-diarylamine reaction product resulting from a process as set forth in claim 4.

9. A modified aliphatic ketone-diarylamine reaction product resulting from a process as set forth in claim 5.

THOMAS H. NEWBY.

References Cited in the file of this patent

UNITED STATES PATENTS

| Number | Name | Date |
|---|---|---|
| 2,183,567 | Howland | Dec. 19, 1939 |
| 2,216,524 | Sibley | Oct. 1, 1940 |
| 2,303,708 | Sibley | Dec. 1, 1942 |
| 2,306,830 | Paul | Dec. 29, 1942 |